United States Patent [19]
Linde et al.

[11] Patent Number: 6,132,505
[45] Date of Patent: *Oct. 17, 2000

[54] INORGANIC PIGMENT PELLETS FOR COLORING PLASTICS, LACQUERS AND BUILDING MATERIALS AND A PROCESS FOR THE PRODUCTION THEREOF

[75] Inventors: Günter Linde, Krefeld; Kai Bütje, Duisburg; Manfred Eitel, Kempen, all of Germany

[73] Assignee: Bayer Aktiengesellschaft, Germany

[ * ] Notice: This patent is subject to a terminal disclaimer.

[21] Appl. No.: 09/017,778

[22] Filed: Feb. 3, 1998

[30] Foreign Application Priority Data

Feb. 10, 1997 [DE] Germany ............................ 197 04 943

[51] Int. Cl.⁷ .............................. C09C 1/00; C09C 3/10
[52] U.S. Cl. ......................... 106/429; 106/447; 106/450; 106/452; 106/460; 106/453; 106/471; 106/476; 106/479; 106/480; 106/491; 106/499; 106/501.1; 106/504; 23/313 R
[58] Field of Search ..................................... 106/425, 429, 106/437, 453, 456, 460, 472, 476, 479, 499, 504, 501.1, 447, 450, 452, 471, 480, 491; 23/313 R

[56] References Cited

U.S. PATENT DOCUMENTS

| | | | |
|---|---|---|---|
| 596,710 | 10/1999 | Linde et al. | 106/501.1 |
| 3,843,380 | 10/1974 | Beyn | 106/499 |
| 4,116,710 | 9/1978 | Avera . | |
| 4,264,552 | 4/1981 | McMahon et al. | 264/117 |
| 4,277,288 | 7/1981 | Lawrence et al. | 106/413 |
| 4,356,162 | 10/1982 | Lumbeck et al. | 423/600 |
| 4,624,678 | 11/1986 | Schneider | 8/526 |
| 4,952,617 | 8/1990 | Ayala et al. | 523/200 |
| 5,634,970 | 6/1997 | Linde et al. | 106/437 |

FOREIGN PATENT DOCUMENTS

| | | |
|---|---|---|
| 0 650 939 | 5/1983 | European Pat. Off. . |
| 0 144 940 | 6/1985 | European Pat. Off. . |
| 0 257 423 | 3/1988 | European Pat. Off. . |
| 0 424 896 A1 | 5/1991 | European Pat. Off. . |
| 0 802 241 | 10/1997 | European Pat. Off. . |
| 0 802 242 | 10/1997 | European Pat. Off. . |
| 28 44 710 | 4/1979 | Germany . |
| 28 19 004 | 11/1979 | Germany . |
| 31 32 303 A1 | 2/1983 | Germany . |
| 38 41 848 A1 | 6/1990 | Germany . |
| 43 36 613 C1 | 2/1995 | Germany . |
| 43 36 612 | 5/1995 | Germany . |
| 2 158 084 | 11/1985 | United Kingdom . |

*Primary Examiner*—C. Melissa Koslow
*Attorney, Agent, or Firm*—Connolly Bove Lodge & Hutz

[57] ABSTRACT

The present invention relates to inorganic pigment pellets for coloring building materials, lacquers and plastics and to a process for the production thereof and to the use thereof inter alia for the production of pastes, suspensions and emulsion paints.

3 Claims, No Drawings

INORGANIC PIGMENT PELLETS FOR COLORING PLASTICS, LACQUERS AND BUILDING MATERIALS AND A PROCESS FOR THE PRODUCTION THEREOF

BACKGROUND OF THE INVENTION

The present invention relates to inorganic pigment pellets for coloring building materials, lacquers and plastics and to a process for the production thereof and to the use thereof inter alia for the production of pastes, suspensions and dispersion paints.

In order to achieve the optimum perceived color, pigments must be ground into primary particles during processing. The resultant powders produce large quantities of dust and, due to their fineness, have a tendency to stick and adhere in metering apparatus. In the case of toxicologically hazardous substances, measures must thus be taken during processing to counter any risks to man and the environment caused by the resultant dusts. Also, there is increasing market demand for the avoidance of dust nuisances even for harmless inert substances, such as for example iron oxide pigments or titanium dioxide pigments.

The avoidance of dust and improved metering due to good flow properties in order to achieve a consistently good perceived color on use in organic media are objectives pursued when handling pigments. These objectives are achieved to a greater or lesser degree by applying pelletizing processes to pigments. The processes used are, for example, agglomeration or spray drying. Conpaction processes are generally less suitable due to the. limited dispersibility of the resultant pellets.

Essentially two opposing requirements are placed upon pigment pellets: mechanical stability of the pellet simultaneously combined with good dispersion characteristics in the medium used. Mechanical stability is responsible for good transport properties, both during transport between the manufacturer and user and for good metering and flow characteristics during use of the pigments. Mechanical stability is brought about by elevated adhesive forces and is dependent, for example, inter alia upon the quantity of binder or also the compressive pressure applied during shaping. On the other hand, dispersibility is influenced by good grinding before pelletization (wet and dry grinding), by the mechanical energy applied during incorporation (shear forces) and by dispersion auxiliary substances, which reduce the adhesive forces in the dry pellets on incorporation into a medium. However, the use of relatively large quantities of dispersion auxiliary substances is limited by the relative costs of the auxiliary and pigment. Moreover, an elevated content of auxiliary substances correspondingly reduces the color intensity or scattering power. Since variations in color strength are generally less than ±5%, the use of additives is limited even if they simultaneously act as coupling agents and dispersion auxiliary substances. Additives must furthermore not impair the service characteristics of the media to be colored, for example strength or notched impact strength in plastics, elastic properties and toughness in elastomers (polymers) and rheological characteristics in paints and lacquers.

Known production processes for pigment pellets are, for example, spray granulation (spray drying using a disk or jet) and agglomeration pelletization (mixers, fluidised bed pelletizers, plates or drums) or compaction processes.

EP-A 0 257 423 U.S. Pat. No. (4,810,305)and DE-A 38 41 848 (U.S. Pat. No. 5,035,748) thus describe spray pelletization using polyorganosiloxanes as hydrophobic, lipophilic additives. The stated atomizing dryer generally results in small particle sizes with an elevated proportion of fines. This means that a substantial proportion of the material is not obtained from the dryer as directly usable pellets, but as fines, which must first be retained in a filter and then returned to the process. In spray dried products, hydrophobing post-treatment results in pellets which have very good flow properties but produce exceptionally large quantities of dust.

EP-A 0 424 896 discloses the production of low-dusting fine pellets in a one-stage process in known intensive mixers. This process uses a low content of waxes in combination with emulsifiers and wetting agents by application of an aqueous dispersion Water contents of 20 to above 50% are generally obtained in this process. These pellets must be dried and separated from oversized and undersized fractions.

DE-A 31 32 303 describes low-dusting, flowable inorganic pigment pellets which are mixed with binders which liquefy under the action of heat (40 to 60° C.) and are pelletized by a screening process using a screening aid (pressure).

EP-A 0 144 940 discloses low-dusting pigment pellets which are produced starting from a filter sludge, by mixing with water, which is at a temperature of approx. 50° C., and adding 0.5 to 10% of surface-active substances and additionally mineral oil or liquefying waxes at 50 to 200° C. until the smearing point is reached. This operation is performed in intensive mixers and is optionally followed by subsequent pelletizing and drying operations. Water is present in the finished product in a quantity of 10 to 15%, which is disadvantageous for incorporation into plastics.

DE-A 28 44 710 (U.S. Pat. No. 4,264,552) describes the pelletization of pigments in a fluidised bed with pelletizing auxiliary substances, wherein dry pigment powder is sprayed with water.

DE-C 28 19 004 (U.S. Pat. No. 4,356,162) describes the pelletization of alkali metal aluminates for the production of cements with the assistance of polyhydroxy compounds.

GB-A 2 158 084 (U.S. Pat. No. 4,624,678) describes the production of dye pellets with solid polyethylene glycols in a melting range of 40 to 150° C., the pellets having a wax content of 33 to 66%, relative to the pigment.

U.S. Pat. No. 4,952,617 describes improved pigment dispersions in aqueous systems using trimethylolpropane or trimethylol ethers. The improvement consists in an improved viscosity of the paste, which results in an extended shelf life.

DE-C 43 36 612 (U.S. Pat. No. 5,634,970) discloses the production of hydrophobized pigment pellets using oils of a specific viscosity in accordance with a modified compaction process.

U.S. Pat. No. 3,843,380 demonstrates the production of pigment pellets using thickeners or thickeners in combination with dispersants.

SUMMARY OF THE INVENTION

The object was thus to provide inorganic pigment pellets which are readily dispersible in the medium and simultaneously exhibit good stability, for example during storage and conveying and which are simple to produce.

DETAILED DESCRIPTION OF THE INVENTION

The present invention provides pigment pellets which are characterised in that they contain one or more water-soluble, hydrophilic or hydrophobic/hydrophilic auxiliary substances which are liquid at 25° C. or mixtures liquid at 25° C. of water-soluble, hydrophilic or hydrophobic/hydrophilic auxiliary substances in a quantity of 0.1 to 10 wt. %, relative to pigment, and have an average particle size of 50 to 1500 µm, a bulk density of 0.3 to 1.8 g/cm$^3$ and a water content of $\leq$2 wt. %, relative to pigment.

The inorganic pigments used are preferably iron oxides, titanium dioxides, zinc oxides, chromium oxides, light-fast pigments, bismuth vanadate, carbon blacks (carbon pigments) and mixtures thereof.

Polyethylene or polypropylene glycols liquid at 25° C. are preferably used as the auxiliary substance. Fatty alcohol polyglycol ethers are also suitable. The liquid auxiliary substance is selected from the group consisting of fluid mixtures of polyethylene or polypropylene glycols, liquid at 25° C., and liquid mixtures of polyethylene or polypropylene glycols liquid at 25° C. with polyglycol compounds having melting points of above 35° C. or polyhydroxy compounds soluble in the polyethylene or polypropylene glycols liquid at 25° C.

The pigment pellets may be produced using various processes, for example by spray drying, agglomeration, pelletization and compaction. The pigment pellets may particularly advantageously be produced from aqueous pigment suspensions with the assistance of binders which have a dispersion-promoting activity on application. The pellets have an average particle size of 50 to 500 µm. In order to improve dispersibility, the material may be subjected to wet grinding in suspension. According to another process, the dry pigment powder may be converted into pellets of an average particle size of 80 to 1500 µm using water, aqueous suspensions or liquid binders on a rotating disk, in a rotating drum, in a mixer or in a fluidized bed process.

Pellets may also be produced from dry pigments, for example finished product, by gentle compaction involving successive stages such as screen-grinding, screening and recirculation of coarse and/or fine product or also further agglomeration pelletization on a plate or in a rotating drum. In compaction pelletization, linear forces of 0.1 to 50 kN/cm are used for compaction, wherein a proportion of the adhesive effect between the pigment particles is assumed by liquid bridging by the liquid binder. Small quantities of water, for example in quantities of less than 3% relative to the pigment, may be considered as a liquid binder. In conventional agglomeration pelletization on rotating disks or mixers, a drying stage generally follows the use of relatively large quantities of water of, for example, 6 to 25%. Drying may also impair dispersibility. Water quantities of >1% often result in the formation of lumps and caking. Liquids having low vapor pressures and/or elevated boiling points (>180° C.) are preferably used in compaction. Residual moisture or nature and quantity of residual liquid also play a part in spray drying and agglomeration pelletization. Water content on drying should thus generally be $\leq$1%, and never more than 2%. Water may escape in small quantities by evaporation through conventional packaging, such as paper etc. during transport or during storage. Sprayed pellets having binders which bring about improved dispersion characteristics and simultaneously improved adhesion are particularly preferred. Binders having a low vapor pressure or elevated boiling points, such as polyhydric alcohols or condensed polyols, may be considered in this connection. Suitable binders for pigment pellets which simultaneously improve dispersibility in emulsion paints, renders and tinting pastes are polyhydric alcohols such as diols, glycerol; sorbitol, trimethylolpropane, polypropylene glycol and fatty alcohol polyglycol ethers. The latter two are liquid at room temperature. Polyethylene glycol alone or mixed with other liquid compounds is particularly suitable, provided that the melting point is no greater than 35° C. Melting points of between 35° C. and approx. 100° C. often result in the pellets sticking or caking during pelletization due to the softened binder. Liquid binders having low vapor pressures, elevated boiling points and solidification points of no higher than 35° C. are thus particularly suitable binders both for spray pelletization and for pelletization by compaction.

The pellets may additionally contain preservatives, defoamers, retention agents, anti-settling agents, wetting agents and emulsifiers.

Hydrophilic or hydrophilic/hydrophobic systems may be considered in this connection for use in dispersion paints, multi-purpose tinting pastes or also lacquer systems (for example water-soluble lacquers). Polyhydric alcohols, sugars, cellulose and cellulose derivatives, sulphonates, polyacrylates, phosphates, polyethers, polyesters, polyaspartic acid, polyhydroxy compounds, in ether and ester form too, are used as hydrophilic binders and dispersants. Hydrophobic groups may be derivatives of fatty alcohols, fatty acids, long-chain alkyl groups or aryl groups and silicone compounds.

The pelletizing step may include using a co- or counter-current spray process by means of a single and two-fluid nozzles or by means of atomizing dryers, and the pellets produced have an average particle size of 50 to 500 µm.

In the process of the present invention at least one inorganic pigment powder is mixed with at least one water-soluble, hydrophilic or hydrophobic/hydrophilic liquid auxiliary substances or mixtures liquid at 25° C. of water-soluble hydrophilic or hydrophobic/hydrophilic auxiliary substances. The compacted and crushed resultant mixture has one fraction with an average particle size of 100 to 1000 µm.

The post treating step of the present invention comprises the application of alcohols, esters, silicone compounds, amines, amides, polyols, polyesters, cellulose derivatives, polyacrylates or polyphosphates in a quantity of 0.01 to 3 wt. %, relative to the pigment pellets.

The following Examples are intended to illustrate the invention in greater detail.

EXAMPLES

Example 1

An iron oxide yellow suspension (Bayferrox 3920; commercial product of Bayer AG) was introduced at a concentration of 25 wt. % solids with 4 wt. % of polyethylene glycol 400 (MW 400), relative to solids, into a spray dryer with a 1 mm nozzle and atomized at a pressure of 10 to 13 bar and dried. Residual moisture content was 0.6 wt. %, average particle size was 146 µm. The same iron oxide yellow was compacted with the above-stated polyethylene glycol at a linear force of 0.7 kN/cm on a compactor having a roller diameter of 200 mm, reduced in size through a screen of a mesh size of 1.5 mm and post-rolled. The finished product had an average particle size of 755 µm. The experiment was repeated wherein, after the post-rolling, the product was additionally passed through a screen of a mesh size of 500 μm and the fine fraction comprising 40–50 wt. % of the quantity was investigated.

Table 1 below shows the data.

TABLE 1

| Product | Process | PEG* 400 [wt. %] | Residual moisture [wt. %] | Drain time from 6 mm cup [sec]; dusting properties | Average PS** [μm] | Quick test (150 μm) 1000/2000/4500 [rpm] | Rel. color intensity*** [%] |
|---|---|---|---|---|---|---|---|
| Powder | — | — | — | does not flow; severe dusting | — | 3/1/1 | 100 |
| Pellets | Spray drying | 4 | 0.6 | 19; slight dusting | 146 | 1/1/1 | 99 |
| Pellets | Compaction | 5 | — | 33; low dusting | 755 | 4/1/1 | 98 |
| Pellets | Screen: 500 μm; fines | 5 | — | —; slight dusting | 453 | 2/1/1 | — |

*PEG—polyethylene glycol, molecular weight 400
**PS—particle size
***in brightening with $TiO_2$ Bayertitan ® R-KB-2 in a 1:5 ratio
Quick test: Dispersion energy at 1000, 2000 and 4500 revolutions per minute for 10 minutes (150 μm wet film thickness). See dispersibility test/evaluation.

Example 2

A suspension of Bayferrox 130M (iron oxide red; commercial product of Bayer AG) was sprayed at a concentration of 50 wt. % solids with the addition of 4 wt. % of polyethylene glycol 400 (molecular weight 400), relative to solids, through a nozzle with a 1.2 mm bore in a spray dryer at an input temperature of 300° C. The average particle size was 149 μm. The pellets flow very well and exhibit dispersibility and color intensity comparable with that of the powder.

The same iron oxide red was mixed with 3 wt. % of polyethylene glycol 400 and compacted at 0.8 kN/cm on a Bepex roller compactor (model 200/100), reduced in size through a screen having a mesh size of 1.5 mm and post-rolled. The pellets had an average particle size of 776 μm. The experiment was repeated and screening to a mesh size of 0.5 mm was additionally performed. Dispersibility was adequate, color intensity was just as good as the powder; dusting and flow properties were better. Table 2 below shows the results.

TABLE 2

| Product | Process | PEG* 400 [wt. %] | Drain time from 6 mm cup [sec]; dusting properties | Average PS** [μm] | Quick test (150 μm) 1000/2000 [rpm] | Rel. color intensity**** [%] |
|---|---|---|---|---|---|---|
| Powder | — | | does not flow; severe dusting | — | 1/1 | 100 |
| Pellets | Spray drying*** | 4 | 21 | 149 | 1/1 | 99 |
| Pellets | Compaction | 3 | 37; low dusting | 776 | 2/1 | 99 |
| Pellets | Compaction, screen: 500 μm; fines | 3 | 39 | 396 | 2/1 | 99 |

*PEG—polyethylene glycol, molecular weight 400
**PS—particle size
***residual moisture 0.3 wt. %
****in brightening with $TiO_2$ Bayertitan ® R-KB-2 in a 1:5 ratio The dispersibility of inorganic colored pigments in dispersion paints is tested by means of a high-speed stirrer:
   Test medium: Dispersion paint, based on PVA emulsion (vinyl acetate, versatic acid vinyl ester), p.v.c*55% (Pigment/extender ratio 40/60)*p.v.c.=pigment volume concentration
   Method: 180 g of white dispersion paint are initially introduced into a vessel and then 6.0 g of the inorganic colored pigment to be tested are sprinkled in with stirring (Bayertitan R-KB-2/inorganic colored pigment ratio by weight=5/1).

Test conditions: The following dispersion conditions were established using a high-speed stirrer disk (diameter 4 cm):

| | |
|---|---|
| 20 min | 2000 rpm (4.3 · m sec$^{-1}$) |
| 10 min | 4500 rpm (9.4 · m sec$^{-1}$) |

After the individual dispersion times, coatings were applied to a wet film thickness of 90 μm and 150 μm (coating knife gap) and dried at room temperature.

Once dry, the coatings (films) are stripped off with a sharp-edged instrument, so causing the undispersed pigment particles to appear on the surface as dots or streaks. In the case of readily dispersible pellets, differentiation may be. improved by additionally performing an assessment with 10 minutes' stirring at 1000 rpm.

Evaluation: The dispersion energy to be applied to the pellets is assessed on a rating scale from 1 to 5:
level 1: no specks
level 2: few specks
level 3: moderate specks
level 4: many specks
level 5: very many specks
Only levels 1 and 2 denote good dispersibility; from level 3, the assessment is inadequate at the applied dispersion energy.

Testing of Relative Color Intensity of Inorganic Colored Pigments in Emulsion Paints in Accordance With DIN 53 234

A dispersion paint is prepared as described for dispersibility. The dried coatings are assessed in the following manner:

The dried coatings are measured in a calorimeter (Dataflash 2000, measurement geometry: D8°, illuminant C/2° with gloss). The standard X, Y, Z color values of the specimen pigment (P) and reference pigment (B) were determined in this manner.

The following equation applies for calculation of relative color intensity F, in %:

$$\text{Relative color intensity in } \% = \frac{(K/S) * specimen}{(K/S) * reference} \times 100$$

The calculation is performed in accordance with DIN 53 234.

Fine Dust Measurement in Accordance With DIN 55 992:

The dust characteristics of a powder or pellet may be measured using a Heubach "Dustmeter". The fine dust discharged from a rotating drum, though which an air stream flows at a defined rate, is determined gravimetrically on a glass fibre filter. By making measurements after differing exposure times, the dust generation profile may be plotted as a function of mechanical loading.

The dust values are assessed as a weight in comparison with the powder. The subjective visual observation of dust on transfer between containers is also used by way of comparison.

Testing of Flow Behavior by Drain Tests in Accordance With DIN 53 21 1

Flow behavior is determined by measuring the drain time in seconds from a cylindrical vessel (volume 100 ml) with a conical base through a defined bore (generally 6 mm).

Medium Particle Size

Medium particle size was determined by sieve analysis, as generally described in Ullmann's Encyclopedia of Industrial Chemistry, 5th Ed., Vol. B 2 (1988), p. 2–23.

100.0 grams of sample were placed on a Retsch® Vibrotronic Type VE 1 sieving machine equipped with test sieves made from rust-free steel according to DIN 4188 and DIN ISO 3310/1, respectively. Depending on particle size distribution, six to eight sieves with openings of 1000, 800, 600, 500, 250, 180, 125, 80 and 40 μm were chosen. Two minutes of sieving with an amplitude of 1 mm afforded the corresponding fractions. The medium particle size (MPS) of each fraction was estimated to be the mean value of the openings of the test sieves limiting the fraction, for example the medium particle size of the fraction 40–80 μm was taken to be 60 μm. The medium particle size of the sample was then calculated by $$\frac{(wt. \% \ fraction \ A * MPS \ fraction \ A) + (wt. \% \ fraction \ B * MPS \ fraction \ B) + \ldots}{100}$$

What is claimed is:

1. Process for the production of inorganic pigment pellets comprising the steps of mixing at least one inorganic pigment powder with at least one water-soluble, hydrophilic or hydrophobic/hydrophilic auxiliary substance liquid at 25° C. of water-soluble, hydrophilic or hydrophobic/hydrophilic auxiliary substances in a quantity of 0.1 to 10 wt. %, relative to the pigment powder, and pelletizing the resultant mixture of by compacting and crushing the resultant mixture, one fraction having an average particle size of 100 to 1000 μm.

2. Process according to claim 1, including the step of post treating the inorganic pigment pellets.

3. Process according to claim 2, wherein the post treating step comprises application of alcohols, esters, silicone compounds, amines, amides, polyols, polyethers, cellulose derivatives, polyacrylates or polyphosphates in a quantity of 0.01 to 3 wt. %, relative to pigment pellets.

* * * * *

UNITED STATES PATENT AND TRADEMARK OFFICE
CERTIFICATE OF CORRECTION

PATENT NO. : 6,132,505
DATED : October 17, 2000
INVENTOR(S) : Gunter Linde, Kai Butje and Manfred Eitel It is certified that error appears in the above-identified patent and that said Letters Patent is hereby corrected as shown below:

In the specification, in column 1, line 32, "conpaction" should be - - compaction - -.

In the specification, in column 1, line 33, delete "." after "the".

In the specification, in column 6, line 45 (Table 2, column 3), add - - ---- - - under PEG* 400 [wt. %].

In the specification, in column 7 line 19, delete "." after "be".

In the specification, in column 7, line 39, insert - - / - - between D8.

In the claims, column 8 line 44 (claim 1, line 7 ), add - - directly or in the form - - after "mixture".

In the claims, column 8, line 45 (claim 1, line 8), add - - an aqueous suspension - - after "of".

Signed and Sealed this

Eighth Day of May, 2001

NICHOLAS P. GODICI

Attest:

Attesting Officer

Acting Director of the United States Patent and Trademark Office